Figure 1:
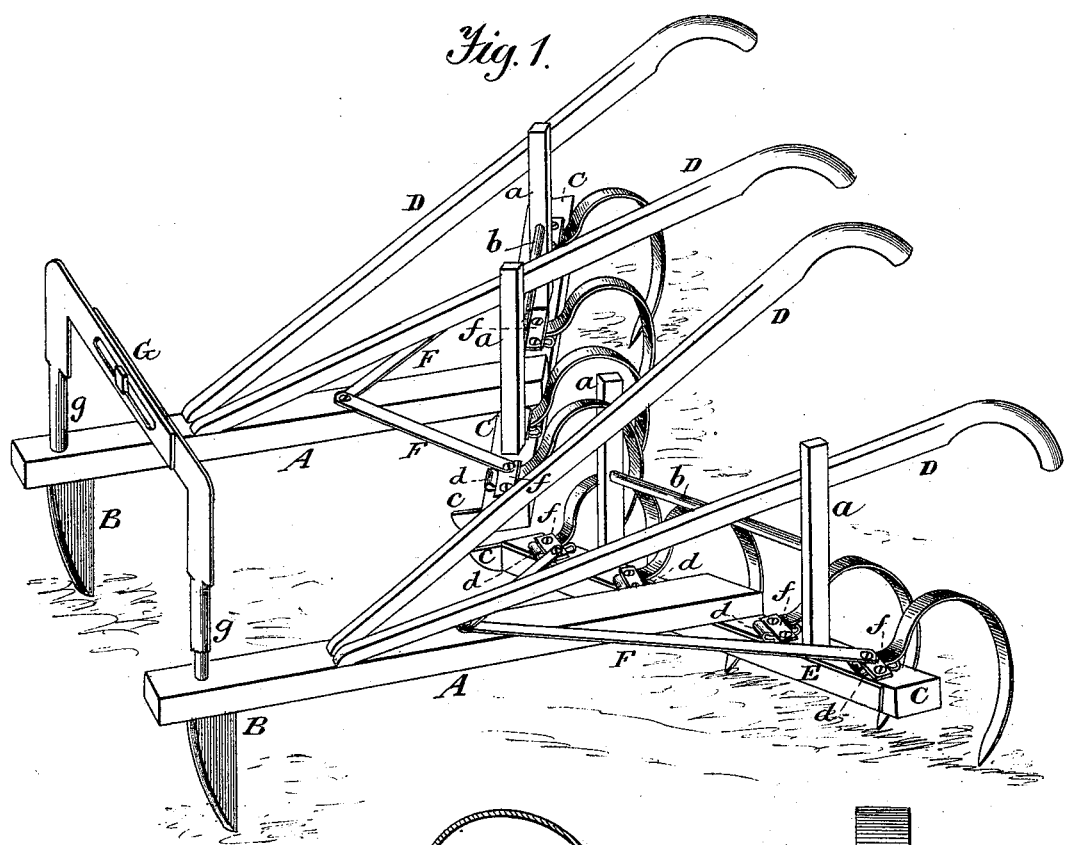

(No Model.)

A. J. OLNEY.
CULTIVATOR.

No. 386,489. Patented July 24, 1888.

Witnesses,
A. Ruppert,
Alfred T. Gage.

Inventor:
Asa J. Olney.
by Franklin H. Hough
his Attorney.

N. PETERS. Photo-Lithographer, Washington, D. C.

UNITED STATES PATENT OFFICE.

ASA J. OLNEY, OF DASH, MICHIGAN.

CULTIVATOR.

SPECIFICATION forming part of Letters Patent No. 386,489, dated July 24, 1888.

Application filed April 4, 1888. Serial No. 269,580. (No model.)

*To all whom it may concern:*

Be it known that I, ASA J. OLNEY, a citizen of the United States, residing at Dash, in the county of Muskegon and State of Michigan, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in agricultural implements; and it has for its objects to simplify and cheapen this class of devices and to provide a double harrow by means of which work may be done in stumpy or stony ground without danger of injury to the machine. The novelty resides in the peculiarities of construction and in the combinations, arrangement, and adaptation of parts, all as more fully hereinafter described, shown in the drawings, and then particularly pointed out in the claim.

The invention is clearly illustrated in the accompanying drawings, which, with the letters of reference marked thereon, form a part of this specification, and in which—

Figure 2:
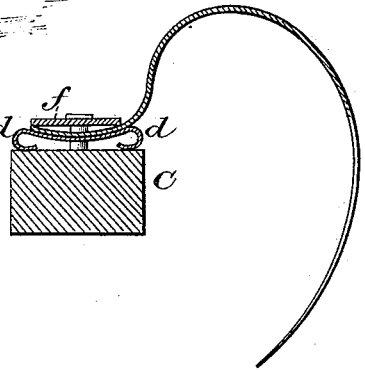
Figure 3:
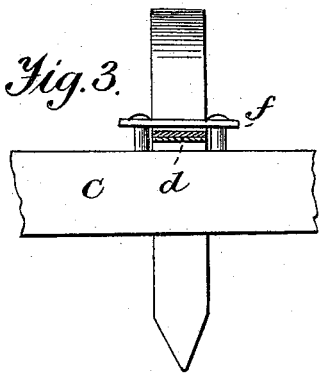

Figure 1 is a perspective view of an implement embodying my improvements; and Figs. 2 and 3 are details, more particularly hereinafter referred to.

Reference being had to the details of the drawings, A represents the draft-beams, to the forward ends of which are vertically adjustably secured the plows or shovels B, the shanks of which extend up through the beams a considerable distance, for a purpose hereinafter described. To the rear ends of the draft-beams are secured the cross-beams C, arranged at an angle, as shown. Rising from the cross-beams—one upon each side of each of the draft-beams—are the standards *a*, connected together by the cross-bars *b*, and to the upper ends of these standards are secured the handles D, the forward ends of which are secured to the draft-beams, as shown in Fig. 1. To the forward edge of the cross-beams I secure the plates E, the adjacent inner ends of which are bent at an angle to the length thereof to form divider-points *c*. The teeth may be of any suitable or well-known shape and material, and are secured in position in the following manner: *d* are bearing-plates resting upon the cross-beams or seated in cavities therein, and in the hollow of these bearing-plates are seated the curved shanks of the teeth, a clamp, *f*, and suitable screws or bolts serving to hold the bearing-plate and tooth in the desired position.

The bearing-plates are made of spring material doubled upon itself, as shown in Fig. 2, thus forming a yielding bearing for the shank of the tooth. F F are braces connected at one end with the draft-beam and at the other end with the cross-beam, the ends at the cross-beam being held in place by the same screws that retain the outer clamps in position, as seen in Fig. 1.

The forward ends of the draft-beams are pivotally connected together, preferably by means of a yoke, G, the lower ends of which are formed with sockets *g* to receive the shanks of the shovels B, and these sockets are made of such a size relative to the shanks as to allow the same to readily swivel when desired. The yoke is made of two parts adjustably connected together, so that the beams may be adjusted nearer to or farther from each other, as occasion may require.

The device is simple and efficient, the teeth will readily pass obstructions without injury to them, and by means of the pivotal or swivel connection between the two harrows the position of either or both of them may be quickly changed while in use in order to avoid an obstruction, such as a stump or a stone.

Having thus described my invention, what I claim to be new is—

The combination, with the cross-beam, of the bearing-plate formed of spring metal doubled upon itself with the bent ends resting on the cross-beam and concaved upon its upper side, the tooth formed with curved shank seated in said concaved portion, and a clamp for holding said tooth and plate in position, substantially as described.

In testimony whereof I affix my signature in presence of two witnesses.

ASA J. OLNEY.

Witnesses:
SAMUEL F. CRUMMELL,
JAMES OLNEY.